United States Patent
Zhou et al.

(10) Patent No.: US 7,565,029 B2
(45) Date of Patent: Jul. 21, 2009

(54) METHOD FOR DETERMINING CAMERA POSITION FROM TWO-DIMENSIONAL IMAGES THAT FORM A PANORAMA

(75) Inventors: Hui Zhou, Toronto (CA); Derek Hang Chun Kwok, Markham (CA); Ian Clarke, North York (CA)

(73) Assignee: Seiko Epson Corporation, Tokyo (JP)

( * ) Notice: Subject to any disclaimer, the term of this patent is extended or adjusted under 35 U.S.C. 154(b) by 801 days.

(21) Appl. No.: 11/177,811

(22) Filed: Jul. 8, 2005

(65) Prior Publication Data
US 2007/0008312 A1    Jan. 11, 2007

(51) Int. Cl.
G06K 9/36    (2006.01)
G06K 9/00    (2006.01)

(52) U.S. Cl. ............... 382/284; 382/285; 382/294; 382/154

(58) Field of Classification Search .......... 382/284, 382/285, 294, 154
See application file for complete search history.

(56) References Cited

U.S. PATENT DOCUMENTS

| | | |
|---|---|---|
| 5,920,657 A | 7/1999 | Bender et al. |
| 5,960,108 A | 9/1999 | Xiong |
| 6,157,747 A | 12/2000 | Szeliski et al. |
| 6,249,616 B1 | 6/2001 | Hashimoto |
| 6,424,752 B1 * | 7/2002 | Katayama et al. ........... 382/284 |
| 6,434,265 B1 | 8/2002 | Xiong et al. |
| 6,516,099 B1 * | 2/2003 | Davison et al. ............. 382/284 |
| 6,535,650 B1 | 3/2003 | Poulo et al. |
| 6,549,651 B2 | 4/2003 | Xiong et al. |
| 6,754,379 B2 | 6/2004 | Xiong et al. |
| 2001/0043738 A1 | 11/2001 | Sawhney et al. |
| 2002/0114536 A1 | 8/2002 | Xiong et al. |
| 2002/0181802 A1 | 12/2002 | Peterson |
| 2003/0044048 A1 | 3/2003 | Zhang et al. |
| 2004/0151365 A1 | 8/2004 | An Chang et al. |

\* cited by examiner

Primary Examiner—John B Strege

(57) ABSTRACT

A method of estimating three-dimensional camera position information from a series of two-dimensional images that form a panorama employs common features in adjoining image pairs in the series to estimate a transform between the images in the pairs. The common features are subsequently employed to adjust an estimated rotational component of each transform by reducing error between coordinates corresponding to the common features in three-dimensional space in image pairs, on a pair-by-pair basis. A global optimization of the position estimation, used for long sequences of images such as 360 degree panoramas, refines the estimates of the rotational and focal length components of the transforms by concurrently reducing error between all 3D common feature coordinates for all adjoining pairs.

14 Claims, 7 Drawing Sheets

METHOD FOR DETERMINING CAMERA POSITION FROM TWO-DIMENSIONAL IMAGES THAT FORM A PANORAMA

FIELD OF THE INVENTION

The present invention relates generally to image processing and more particularly to a method, apparatus and computer program for estimating three-dimensional camera position information from a plurality of two-dimensional source images that combine to form a panorama.

BACKGROUND OF THE INVENTION

Digital cameras are becoming increasingly popular and as a result, a demand for image processing software that allows photographers to edit digital images exists. In many instances, it is difficult or impossible for a photographer to capture a desired entire scene within a digital image and retain the desired quality and zoom. As a result, photographers are often required to take a series of overlapping images of a scene and then stitch the overlapping images together to form a panorama.

Many techniques for creating a panorama from a series of overlapping images have been considered. For example, U.S. Pat. No. 6,549,651 to Xiong et al. discloses a method of aligning images through projective registration and subsequent calibration. Overlapping images are registered projectively using a gradient-based optimization method in combination with a correlation-based linear search. Registration is performed by comparing overlapping areas between overlapping images at certain predetermined resolution levels on a Gaussian pyramid representing the overlapping images. Different combinations of overlap are tried to achieve an optimal overlap which generally minimizes the average brightness and contrast difference with respect to certain transformation parameters. After local registration, a global optimization is used to remove inconsistencies. During the global optimization phase, errors determined from cyclically overlapping sets of images is minimized across all image pairs. Prior to registration, internal and external camera parameters are input into the transformation matrices by a computer assuming default values, or manually with user input.

It is often desirable to obtain a three-dimensional model from a set of two-dimensional images that form a panorama. Such a model is useful where it is needed to map a 360-degree panorama onto a single two-dimensional image space. Simple image stitching in this instance is not possible because some of the images will have been captured behind the chosen point of view of the two-dimensional image. As such, rotational and image focal length information is desirable. However, such three-dimensional information is lost when a single image is captured in two-dimensions.

Approaches to retaining or extracting three-dimensional information for such purposes have been proposed. For example, U.S. Pat. No. 6,157,747 to Szeliski et al. discloses a method of aligning a set of overlapping images to create a mosaic. A difference error between a first image and an adjacent image is determined and an incremental rotation of the adjacent image relative to a three dimensional coordinate system is computed through an incremental angle which tends to reduce the difference error. The focal length for each image is first estimated by deducing the value from one or more perspective transforms computed using an eight-parameter method. A three-parameter rotational model is employed in order to directly estimate the three-dimensional rotation matrix. Once the three-parameter rotational model has been used to estimate the 3D rotation matrices, a global optimization step is performed. The global optimization uses a patch-based alignment whereby patches of each image in a pair are determined to be matches and the distance between all identified pairs in the set are simultaneously minimized.

U.S. Pat. No. 5,920,657 to Bender et al. discloses a method of creating a high resolution still image using a number of images of a scene having different focal lengths. Camera motion is recovered by modeling the change between successive image frames due to camera zoom as a velocity of portions of the image in the horizontal, vertical and scale directions. Once the velocity between image frames for matching image portions is determined in each of these three directions, the value for any pixel in any image frame can be warped to a corresponding location in an image frame of a different focal length. The method is directed largely to warping images of the same scene to different scales, but is said to be applicable for creating a single panorama still from a series of "pan and jib" shots. In this situation, it is assumed that each image frame is produced at the same focal length.

U.S. Pat. No. 6,249,616 to Hashimoto discloses a method for combining images. Three-dimensional relationships between images are determined and an output image is created by combining the input images in accordance with the determined 3D relationships. Overlap is estimated by cross-correlation in the spatial or frequency domain, or by corresponding Laplacian pyramid levels of the input images. The translation parameters found during determination of overlap are converted into rotational parameters using an initial estimate of focal length. The rotational parameter equations are solved at each level of a Gaussian pyramid for each pair of overlapping images by determining the least squared difference between the intensity data of pixels of the overlapping portions in a remapped input image and the target image. The transformations are made globally consistent by treating the pair wise transformations as estimates and characterizing the distribution of the estimates as a covariance matrix. The covariance matrix is then used as a measure of the relative confidence in the estimate of each parameter value, and is adjusted to change high confidence estimates less than low confidence estimates.

Although the above references disclose techniques for estimating camera position information from two-dimensional images, improvements are desired. It is therefore an object of the present invention to provide a novel method, apparatus and computer program for estimating a three-dimensional model and thereby camera position from a set of two-dimensional images that combine to form a panorama.

SUMMARY OF THE INVENTION

Accordingly, in one aspect there is provided, a method of estimating camera position information from a series of source images that form a panorama, the method comprising:

estimating a transform between adjoining image pairs in said series based on common features within said adjoining image pairs;

determining a rotational component for each transform and three-dimensional coordinates for said common features;

adjusting each of the rotational components to reduce errors between corresponding ones of said coordinates in adjoining image pairs; and calculating focal lengths based on the adjusted rotational components.

In one embodiment, the common features are matching corners. The rotational component is determined by making an initial estimate of the focal length for each image. This may be done by calculating the diagonal of the image as the focal length. Prior to the adjusting, a reference image is placed onto an equator of a three-dimensional model, at a distance equal to a respective initial estimate of focal length from an origin of the model. Adjoining images are sequentially placed into the model based on respective initial estimates of focal length and rotational component and rays are identified from the origin to corresponding ones of the coordinates in adjoining images. Adjusting thereby comprises reducing error in direction between corresponding ones of the rays.

In one embodiment, in the event that predetermined conditions are satisfied, the focal lengths and rotational components are concurrently refined to globally reduce errors between corresponding ones of the coordinates in all image pairs. The predetermined conditions may be either that the series of source images form a 360 degree panorama; the series of source images form greater than one row with an extent greater than one; or the series of source images form greater than one column with an extent greater than one.

According to another aspect there is provided a method of estimating camera position information from a series of source images that form a panorama, the method comprising:

registering adjoining image pairs in said series based on common features within said adjoining image pairs;

estimating a transform between each of said adjoining image pairs using said common features;

estimating a rotational component for each said transform;

adjusting each rotational component to reduce differences between said common features in a three-dimensional coordinate system; and calculating focal lengths based on the adjusted rotational components.

According to yet another aspect there is provided an apparatus for estimating three dimensional camera position information from a set of two dimensional images forming a panorama, the device comprising:

a transform estimator estimating a transform between adjoining image pairs in said series based on common features within said adjoining image pairs;

a rotational component determinor determining a rotational component for each transform and three-dimensional coordinates for said common features;

an adjustor adjusting each of the rotational components to reduce errors between corresponding ones of said coordinates in adjoining image pairs; and a focal length calculator calculating focal lengths based on the adjusted rotational components.

According to still yet another aspect there is provided, an apparatus device for estimating three-dimensional camera position information from a set of two-dimensional images forming a panorama comprising:

means for registering adjoining image pairs in said series based on common features within said adjoining image pairs;

means for estimating a transform between each of said adjoining image pairs using said common features;

means for estimating a rotational component for each said transform;

means for adjusting each rotational component to reduce differences between said common features in a three-dimensional coordinate system; and means for calculating focal lengths based on the adjusted rotational components.

According to still yet another aspect there is provided, a computer readable medium embodying a computer program for estimating camera position information from a set of two dimensional images forming a panorama, said computer program including:

computer program code for estimating a transform between adjoining image pairs in said series based on common features within said adjoining image pairs;

computer program code for determining a rotational component for each transform and three-dimensional coordinates for said common features;

computer program code for adjusting each of the rotational components to reduce errors between corresponding ones of said coordinates in adjoining image pairs; and computer program code for calculating focal lengths based on the adjusted rotational components.

According to still yet another aspect there is provided, a computer readable medium embodying a computer program for estimating camera position information from a set of two-dimensional images forming a panorama, said computer program including:

computer program code for registering adjoining image pairs in said series based on common features within said adjoining image pairs;

computer program code for estimating a transform between each of said adjoining image pairs using said common features;

computer program code for estimating a rotational component for each said transform;

computer program code for adjusting each rotational component to reduce differences between said common features in a three-dimensional coordinate system; and computer program code for calculating focal lengths based on the adjusted rotational components.

Because common features such as matching corners are used to estimate a transform between adjoining images, the identified common features are already available to be used for adjusting the rotational components. Use of these common features during the rotational component adjustment stage saves additional processing resources and time. Furthermore, because a gradient-based optimization technique for directly estimating the 3D rotation matrix and focal lengths is not employed, slow convergence and getting stuck in local minima is avoided. These problems are common when using gradient based optimization with eight- or even three-parameter rotational models. Employing common feature points built up during registration allows linear equations to be directly solved and as a result the camera position from a set of two-dimensional images that form a panorama can be estimated in a simple manner that requires fewer steps than the prior art techniques described above.

BRIEF DESCRIPTION OF THE DRAWINGS

Embodiments will now be described more fully with reference to the following drawings, in which.

DETAILED DESCRIPTION OF THE EMBODIMENTS

In the following description, embodiments of a method, apparatus and computer program for estimating camera position information from a series of source images that form a panorama are provided. During camera position estimation, a transform between adjoining image pairs in the series based on common features within the adjoining image pairs is estimated. A rotational component for each transform and three-dimensional coordinates for the common features are determined. Each of the rotational components is adjusted to reduce errors between corresponding ones of the coordinates in adjoining image pairs. Focal lengths are then calculated based on the adjusted rotational components.

The method and apparatus may be embodied in a software application including computer executable instructions executed by a processing unit such as a personal computer or other computing system environment. The software application may run as a stand-alone digital image editing tool or may be incorporated into other available digital image editing applications to provide enhanced functionality to those digital image editing applications. The software application may include program modules including routines, programs, object components, data structures etc. and be embodied as computer readable program code stored on a computer readable medium. The computer readable medium is any data storage device that can store data, which can thereafter be read by a computer system. Examples of computer readable medium include for example read-only memory, random-access memory, CD-ROMs, magnetic tape and optical data storage devices. The computer readable program code can also be distributed over a network including coupled computer systems so that the computer readable program code can also be distributed over a network including coupled computer systems so that the computer readable program code position from a set of two dimensional images that form a panorama will now be described more fully with reference to the Figures.

Figure 1:
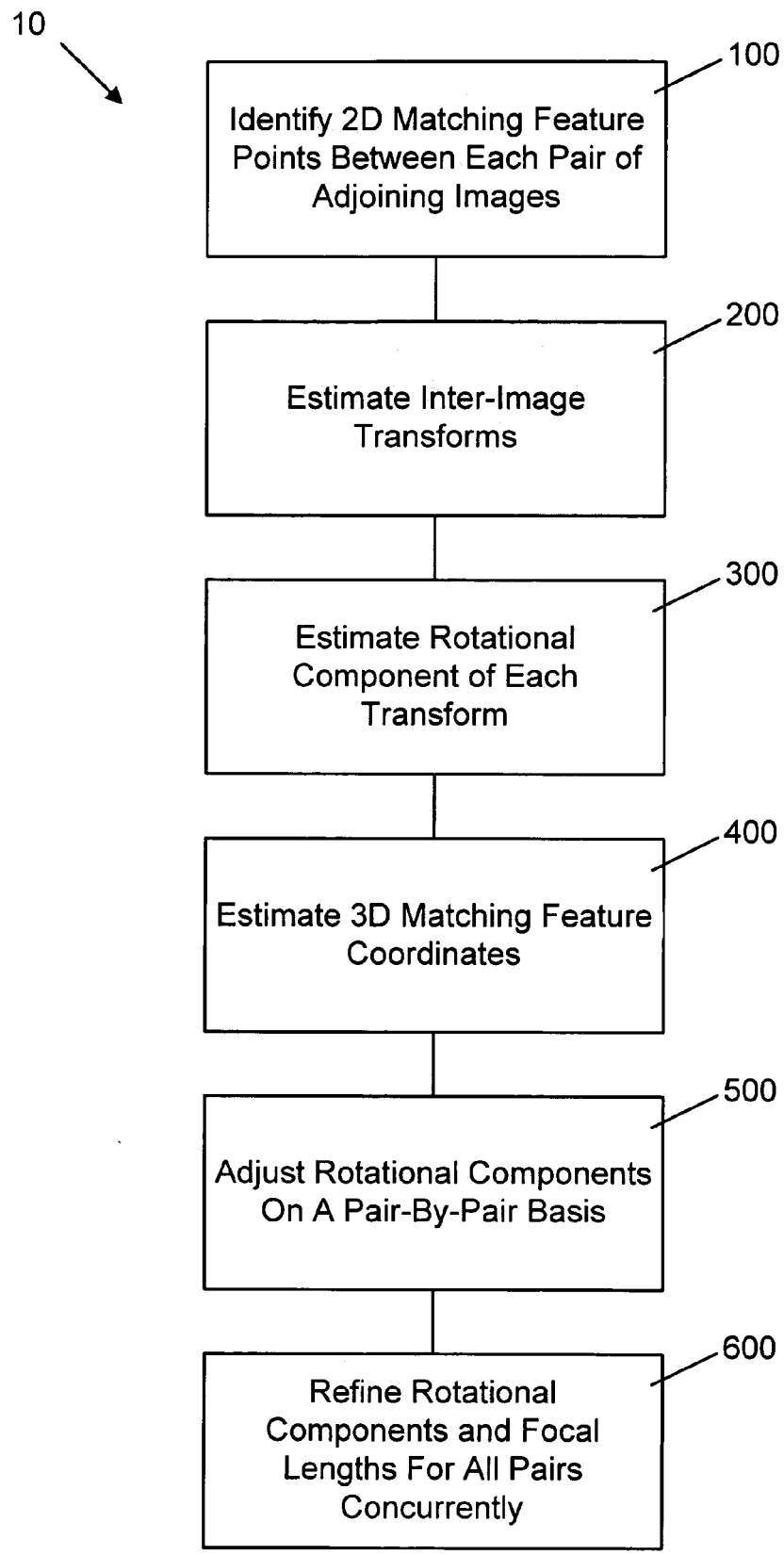
FIG. 1 is a flowchart showing the general steps performed during determination of three-dimensional camera position information from a series of two-dimensional images that combine to form a panorama.

Turning now to FIG. 1, a flowchart showing the general steps for estimating three-dimensional camera position information from a series of two-dimensional images that combine to form a panorama is shown. Matching feature points common to adjoining image pairs are identified (step 100) and used to estimate a 2D transformation between images for each pair (step 200). Based on the principle that the 2D transformation includes focal length and rotation components, the rotational component for each transform is estimated (step 300). Three-dimensional matching feature coordinates are then estimated from image parameters (step 400). Based on the rotational component estimations and the three-dimensional matching feature coordinate estimations, each rotational component is then individually adjusted to reduce the error between matching feature coordinates in the adjoining image pairs (step 500). Once the rotational components have been adjusted individually, the rotational components and focal length components for all transforms are concurrently refined to reduce the overall error between matching features points between the adjoining images of all pairs (step 600).

Figure 2:
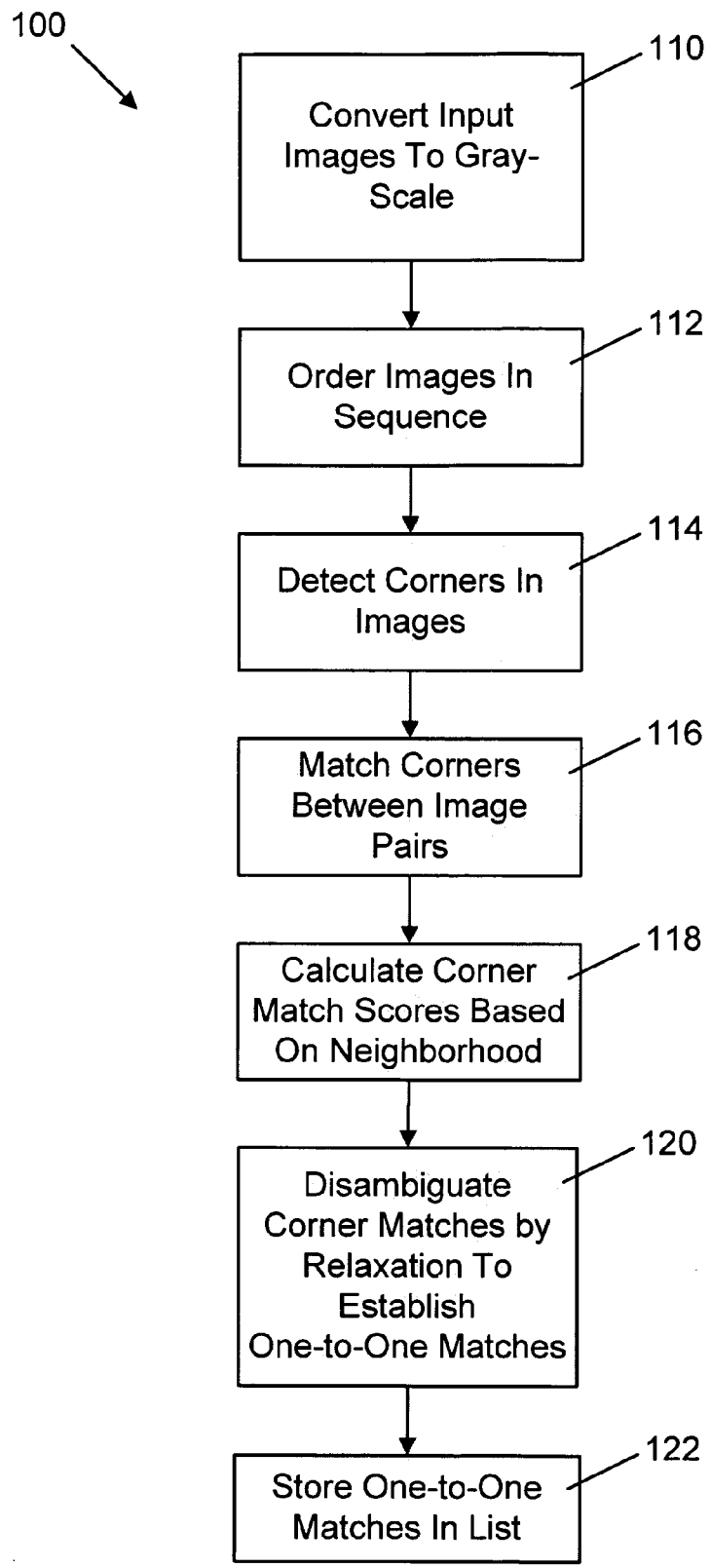
FIG. 2 is a flowchart showing the steps performed during estimation of matching feature points between pairs of adjoining images.

FIG. 2 better illustrates the steps performed during identification of two-dimensional matching feature points between pairs of adjoining images at step 100. First, input images are converted to gray-scale (step 110). The images are ordered right-to-left or left-to-right so that each pair of adjoining images includes overlapping portions (step 112). This is done by a user, either manually or as a result of image capture order. Following image ordering, features corresponding to high curvature points in the adjoining images are extracted and corners within the features are detected using a gray-scale Harris corner detection algorithm (step 114).

The Gray-scale Harris corner detect is based on the following operator:

$$c(x, y) = \frac{\overline{(I_x)^2} \cdot \overline{(I_y)^2} - (\overline{(I_x \cdot I_y)})^2}{\overline{(I_x)^2} \cdot \overline{(I_y)^2} + \varepsilon} \quad (1)$$

where:
c(x, y) is a detected corner;
y and x are the co-ordinates of a pixel in the image assuming the top-left corner of the image is at co-ordinate (0,0);
$I_x$ and $I_y$ indicate the directional derivatives respectively;
$\varepsilon$ is a small number to avoid overflow; and
$\overline{I}$ is a box filter smoothing operation on $I_x$ and $I_y$.

A 7×7 pixel window is used to filter out closed corners within a small neighborhood surrounding each feature. The first three hundred corners c(x, y) detected in each of the adjoining images I and I' are used. If the number of detected corners in the adjoining images I and I' is less than three hundred, all of the detected corners are used.

For each corner c in image I, a correlation for all corners c' in image I' is made (step 116). This is equivalent to searching the entire image I' for each corner c of image I. A window centered at corner c and c' is used to determine the correlation between the corners c and c'. Normalized cross correlation NCC is used for calculating a correlation score between corners c(u,v) in image I and corners c'(u',v') in image I'. The normalized cross correlation NCC is expressed as:

$$NCC(c, c') = \frac{\left( \sum_{i=-7}^{7} \sum_{j=-7}^{7} (I(u+i, v+j) - \mu_{I'}) \right)}{\left[ \sum_{i=-7}^{7} \sum_{j=-7}^{7} (I(u+i, v+j) - \mu_{I})^2 \sum_{i=-7}^{7} \sum_{j=-7}^{7} (I'(u'+i, v'+j) - \mu_{I'})^2 \right]^{1/2}} \quad (2)$$

Corner match correlation scores are then calculated (step 118). The correlation scores range from minus 1, for two correlation windows that are not similar at all, to 1 for two correlation windows that are identical. A threshold is applied to choose the matching pairs of corners. In the present embodiment, a threshold value equal to 0.6 is used although the threshold value may change for particular applications. After initial corner matching, a list of corners is obtained in which each corner c in image I has set of candidate matching corners c' in image I'. In the preferred embodiment, the maximum permissible number of candidate matching corners is set to 20, so that each corner c in image I possibly has 0 to 20 candidate matching corners in image I'.

Once each corner c in image I has been matched to a set of candidate matching corners in image I', a relaxation technique is used to disambiguate the matching corners (step 120). For the purposes of relaxation it is assumed that a candidate matching corner pair (c, c') exists where c is a corner in image I and c' is a corner in image I'. Let $\Psi(c)$ and $\Psi(c')$ be the neighbor corners of corners c and c' within a neighborhood of N×M pixels. If candidate matching corner pair (c, c') is a good match, many other matching corner pairs (g, g') will be seen within the neighborhood where g is a corner of $\Psi(c)$ and g' is a corner of $\Psi(c')$ such that the position of corner g relative to corner c will be similar to that of corner g' relative to corner c'. On the contrary, if candidate matching corner pair (c, c') is a bad match, only a few or perhaps no matching corner pairs in the neighborhood will be seen.

A score of matching SM is used to measure the likelihood that candidate matching corners c and c' are in fact the same corners according to:

$$SM(c, c') = \sum_{g_i \in \Psi(c)} \left[ \max_{g'_j \in \Psi(c')} \frac{NCC(g_i, g'_j)\delta(c, c'; g_i, g'_j)}{K + dist(c, c'; g_i, g'_j)} \right] \quad (3)$$

where:
NCC(g, g') is the correlation score described above;
K=5.0 is a constant weight;
$dist(c,c';g_i,g'_j) = \lfloor d(c,g_i) + d(c',g'_j) \rfloor / 2$, with $d(c,g_i)$ being the Euclidean distance between corners c and $g_i$ and $d(c',g'_j)$ being the Euclidean distance between corners c' and $g'_j$; and $$\delta(c, c'; g, g') = \begin{cases} e^{-r/\lambda} \\ 0 \end{cases} \text{ if } (g, g') \text{ is a candidate match and } r < \lambda$$

otherwise in which, $$r = \frac{|d(c_i, g_i) - d(c', g'_j)|}{dist(c, c'; g_i, g'_j)};$$

and $\lambda = 0.3$ is a threshold based on the relative distance difference.

It is assumed that the angle of rotation in the image plane is less than 60 degrees. The angle between vectors $$\overrightarrow{cg} \text{ and } \overrightarrow{c'g'}$$

is checked to determine if it is larger than 60 degrees and if so, $\delta(c, c'; g, g')$ takes the value of 0. The candidate matching corner c' in the set that yields the maximum score of matching SM is selected as the matching corner.

Following performance of the above relaxation technique, a list of matching corners exists without ambiguity such that a corner c of image I only corresponds to one corner c' in image I' thereby to yield a registration matrix for each image I that registers the corners c in image I to corresponding corners c' in adjoining image I'. The list of matching corners is stored in read/write memory such as RAM or on a hard disk for later processing (step 122).

With the two-dimensional matching feature points in adjoining images identified, the two-dimensional transforms between the images in adjoining image pairs from the two-dimensional matching feature points are estimated as will now be more fully described.

Figure 3:
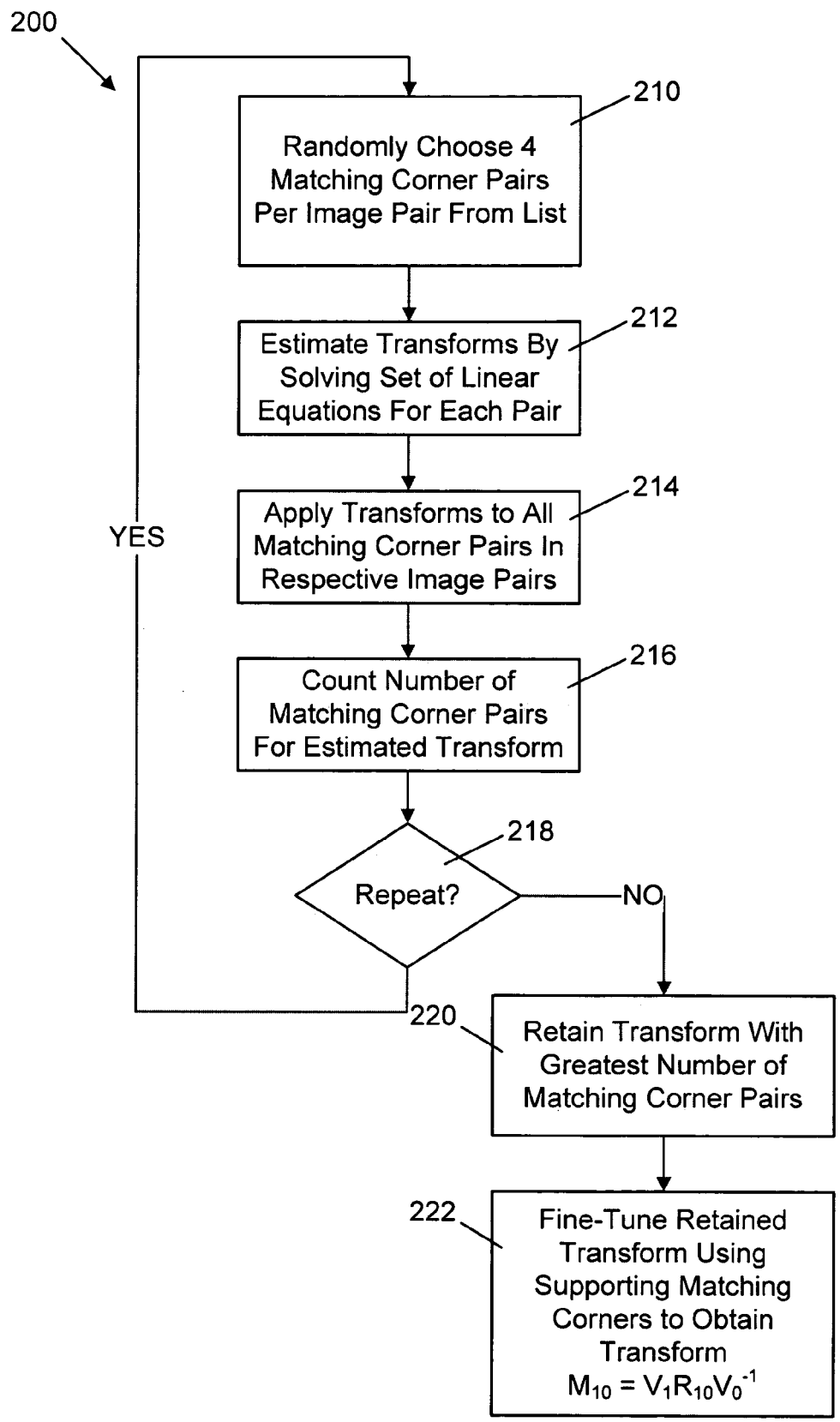
FIG. 3 is a flowchart showing the steps performed during estimation of the transforms between adjoining images using the matching feature points.

With reference to the flowchart of FIG. 3, during projective transform estimation, a random sample consensus algorithm (RANSAC) based technique is used. Initially, N pairs of matching corners are chosen from the registration matrix (step 210) and a projective transform detailing the transformation between the matching corners is estimated by solving a set of linear equations modeling the projective transform (step 212). The estimated projective transform is then evaluated by examining the support from other pairs of matching corners (step 214). This process is repeated (step 218) using other sets of randomly chosen N pairs of matching corners. The projective transform that supports the maximum number of corner matches is selected (step 220), and the transform is fine-tuned using other supporting corners (step 222). In particular, the above-described process is carried out following the procedure below:

1. MaxN←0
2. Iteration←1
3. For each set of randomly chosen N pairs of matching corners, perform steps 4 to 10
4. Iteration←Iteration+1
5. If (Iteration>MaxIteration), go to step 11.
6. Estimate the projective transform by solving the appropriate set of linear equations
7. Calculate N, the number of matched corner pairs supporting the projective transform
8. If (N>MaxN), perform steps 9 and 10; else go to step 3
9. MaxN←N
10. Optimal Transform←Current Transform
11. If (MaxN>5), return success; otherwise return failure.

Theoretically, to estimate the projective transform, four pairs of matching corners are needed. It is possible that a pair of matching corners is dependent, which makes the matrix singular. To avoid this, at least five pairs of matching corners are required for a successful projective transform estimation to be determined. A least squares LSQR solver is used to solve the set of linear equations and a heuristic constraint is applied. That is, if the estimated projective transform matrix is not satisfied by the heuristic constraint, then it is assumed the projective transform estimation is bad and there should be no matching corners supporting it. For transform matrix M having the form:

$$M = \begin{bmatrix} a_{11} & a_{12} & a_{13} \\ a_{21} & a_{12} & a_{23} \\ a_{31} & a_{12} & 1.0 \end{bmatrix} \quad (4)$$

then M should satisfy the following constraint:

$|a_{11}| \in (0.5, 1.7), |a_{12}| < 0.8, |a_{13}| < W,$ $|a_{21}| < 0.8, a_{12} \in (0.5, 1.7), |a_{23}| < H,$ $|a_{31}| < 0.1, |a_{23}| < 0.1.$ in which, W and H are the width and height of the image, respectively.

The maximum number of iterations (MaxIteration) is given heuristically too. In the preferred embodiment, the maximum number of iterations follows the equation:

$$P = 1 - [1-(1-\chi)^\eta]^m \qquad (5)$$

where:
P is the probability that there is a correct solution;
$\chi$ is the percentage of false matching corner pairs;
$\eta$ is the number of matching corners needed for a solution (ten for projective); and
m is the maximum number of random iterations.

To speed up the approach, a two-step estimation is used. Initially, a maximum number of 250 iterations for projective transform estimation is performed. If the estimation fails, 2000 iterations are performed for projective transform estimation.

After the transform between each adjoining pair of images I and I' has been determined resulting in transformation matrices that project each image I onto its adjoining image I', the adjoining pairs of images are analyzed for motion. During this process, a mask that describes moving objects between adjoining images is generated to avoid object doubling in the panorama. Pixels in aligned images will generally be very similar except for small differences in lighting. A difference image is generated for each pair of adjoining images and a threshold is applied to determine pixels in the adjoining images that moved. Black pixels in the difference image represent pixels that do not move and white pixels in the difference image represent pixels that move. The transform between each adjoining image is then re-estimated excluding pixels in the adjoining images that move.

Figure 4:
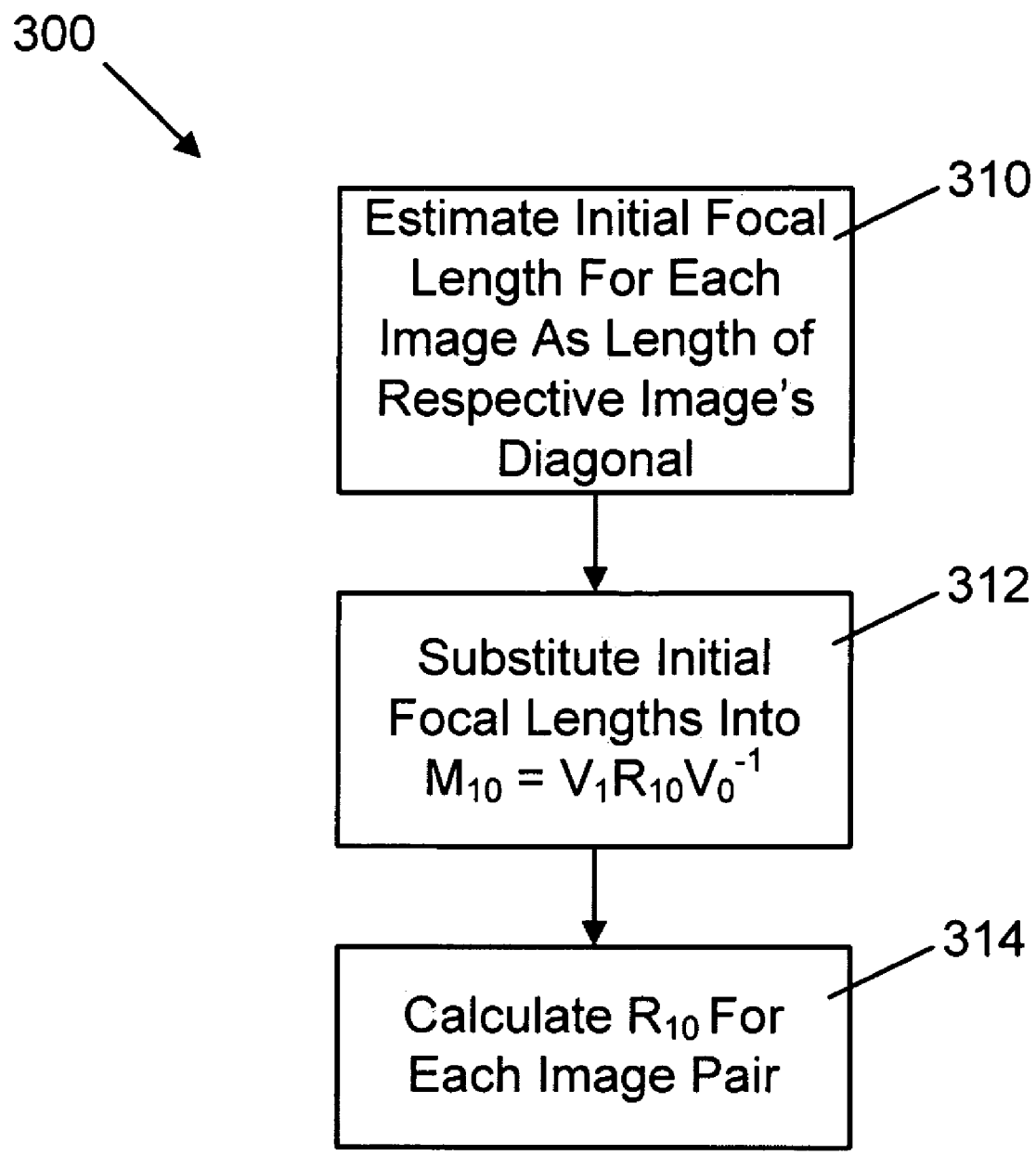
FIG. 4 is a flowchart showing the steps performed during estimation of rotational components for each of the transforms.

Following estimation of the two-dimensional transforms between respective adjoining image pairs, the rotational component of each transform are estimated as will now be described with reference to FIG. 4.

It will be understood that a projective transformation matrix gives a 2D to 2D transformation between any pair of images. However, the projective transformation matrix may actually be considered a product of four matrices:

$$M_{10} = V_1 R_1 R_0^{-1} V_0^{-1} \qquad (6)$$

where $V_i$ is the focal length matrix of image i, and $R_i$ is the rotation matrix for the camera between first and second image captures. These matrices have the form:

$$V_i = \begin{bmatrix} f_i & 0 & 0 \\ 0 & f_i & 0 \\ 0 & 0 & 1 \end{bmatrix} \qquad (7)$$

$$R_i = \begin{bmatrix} r_{00} & r_{10} & r_{20} \\ r_{01} & r_{11} & r_{21} \\ r_{02} & r_{12} & r_{22} \end{bmatrix} \qquad (8)$$

Equation (6) defines the imaging process for capturing adjoining images; that is the camera is rotated and used to capture an image, and then rotated again to capture another image. Focal lengths during capture of adjoining images can of course be different.

As is well understood by one of ordinary skill in the art, when an image is captured, the three-dimensional feature information in that image is lost. However, on the basis that a projective transformation matrix includes rotational and focal length components, re-determining the three-dimensional information by using the feature points common to overlapping images is possible.

To assist with determining three-dimensional information, it is generally not necessary to know explicitly the rotation matrix from the first image in the set for both of the images involved. Rather, it is sufficient to know the rotation matrix between the two images. In this case, equation (6) may be re-written as:

$$M_{10} = V_1 R_{10} V_0^{-1} \qquad (9)$$

where $R_{10}$ is the rotation matrix between adjacent images 0 and 1.

Multiplying out these matrices yields the following results:

$$M = \begin{bmatrix} m_{00} & m_{10} & m_{20} \\ m_{01} & m_{11} & m_{21} \\ m_{02} & m_{12} & 1 \end{bmatrix} \approx \frac{f_1}{f_0} \begin{bmatrix} r_{00} & r_{10} & r_{20}f_0 \\ r_{01} & r_{11} & r_{21}f_0 \\ r_{02}/f_1 & r_{12}/f_1 & r_{22}f_0/f_1 \end{bmatrix} \qquad (10)$$

As will be appreciated, the entry in the last column and last row will not match, since the matrix M is scaled by the value $m_{22}$.

In order to estimate the rotational component of the transforms, an initial focal length for each image is estimated using the length of the image diagonal (step 310) according to the equation:

$$\text{Diagonal\_Length} = \sqrt{(\text{IMAGE\_Width})^2 + (\text{IMAGE\_Height})^2} \qquad (11)$$

The initial focal length estimations are substituted into Equation (10) (step 312) for each image in a pair, and the corresponding rotation component, matrix R, is calculated from the transform M (step 314).

Figure 5:
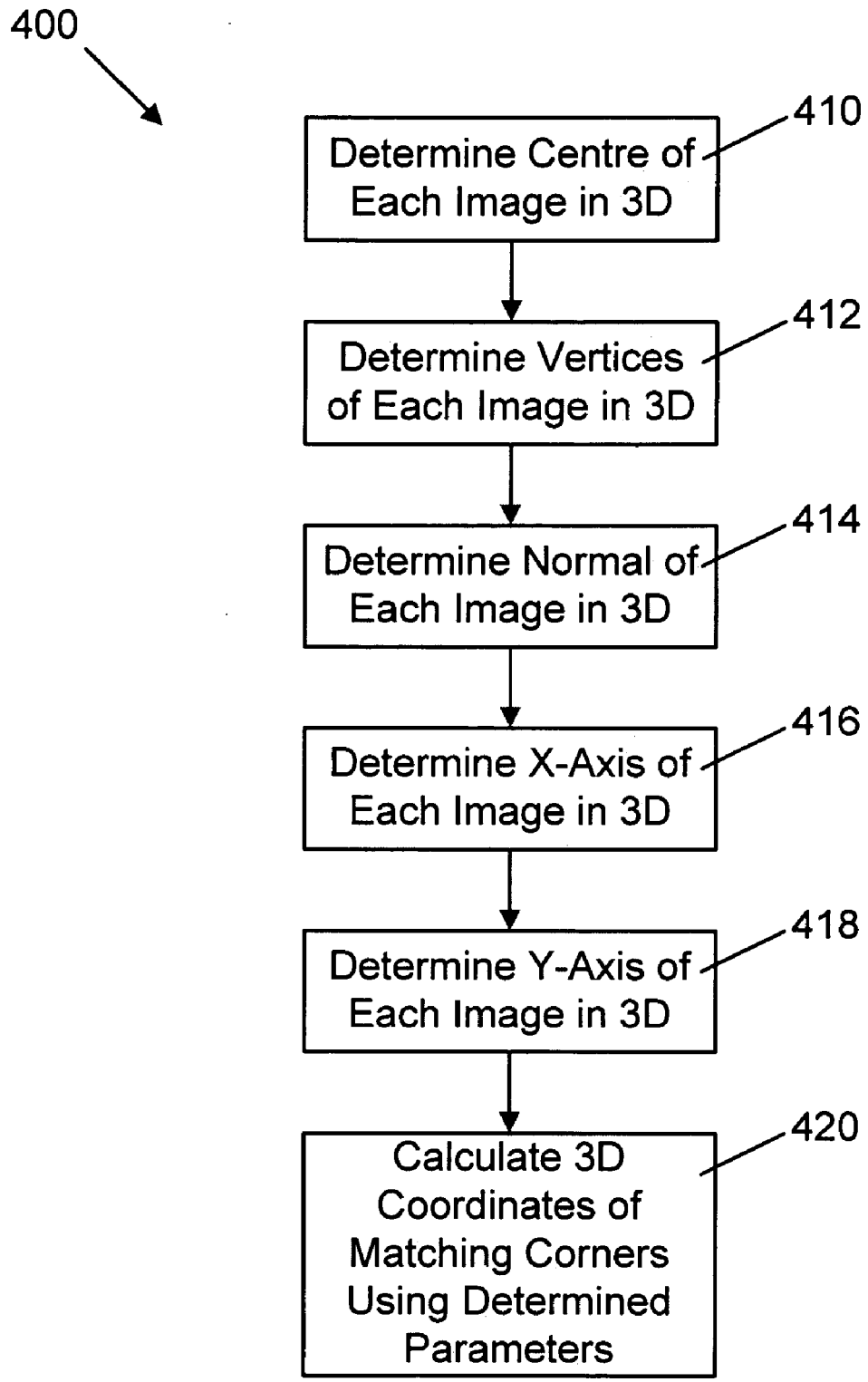
FIG. 5 is a flowchart showing the steps performed during estimation of three-dimensional coordinates of the matching feature points.

Once the respective rotational component of each transform has been estimated as described above, the three-dimensional coordinates of the feature points in three-dimensional space is estimated as will now be described with reference to FIG. 5.

Initially, three-dimensional coordinates of the feature points are estimated by first obtaining parameters that place each image into a three-dimensional model. In order to estimate the 3D placement of images into the three-dimensional model, the 3D center of each image is determined (step 410), the four 3D vertices of each image are determined (step 412), the 3D normal of each image is determined (step 414), the 3D x-axis of each image is determined (step 416), and the 3D y-axis of each image is determined (step 418).

The list of matching feature points for the adjoining images that was previously stored is used to register the adjoining images. On the basis of the initial estimates of transform focal lengths and rotation matrix, the matching feature points for each image are converted to 3D coordinates in the three-dimensional model using the estimated parameters (step 420). The rotation matrix and the matching feature points link each image with its adjoining neighbor.

Figure 6:
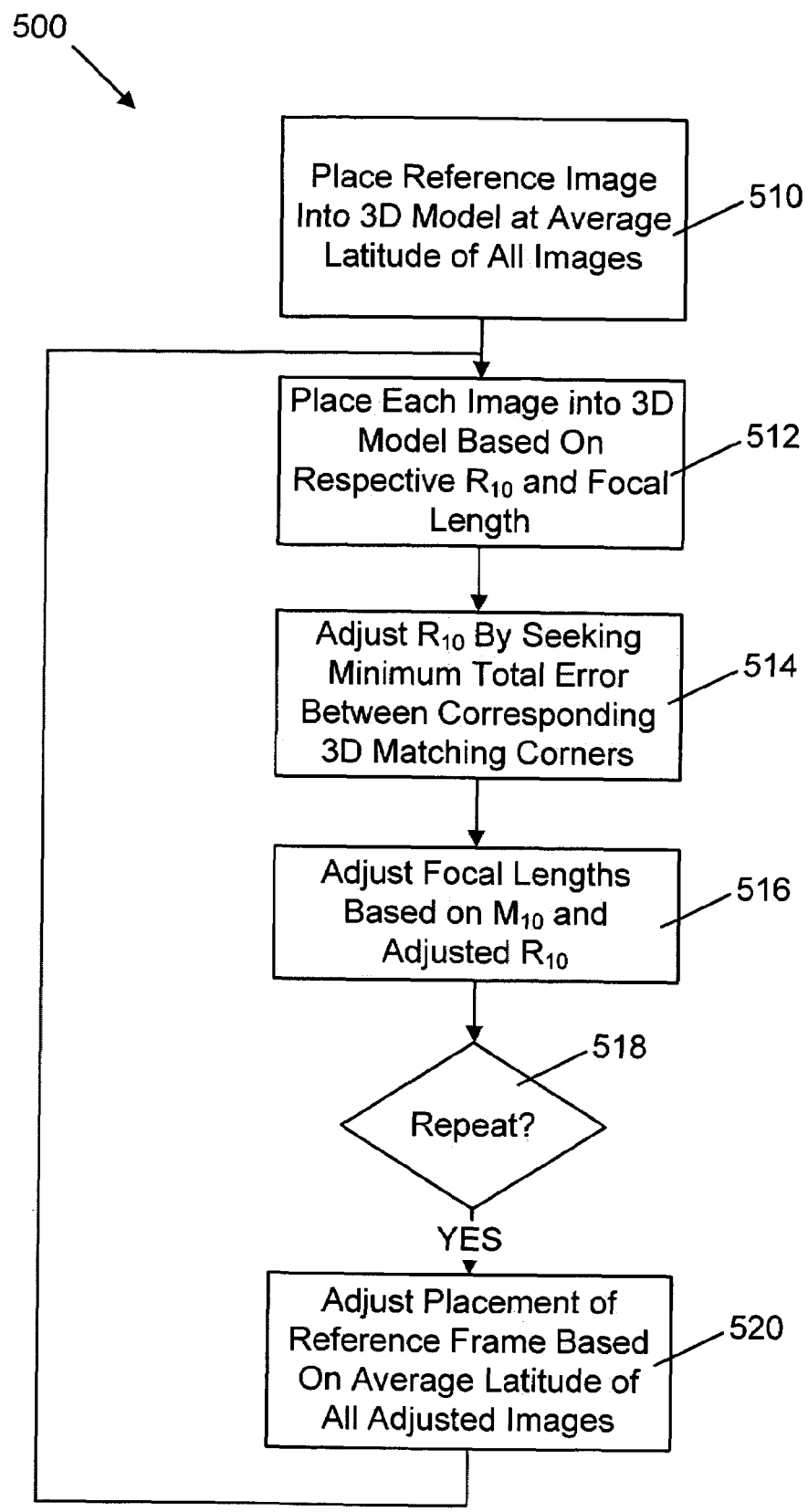
FIG. 6 is a flowchart showing the steps performed during adjustment of the rotational components to minimize the inter-image error between the matching three-dimensional coordinates.

Having now estimated the three-dimensional coordinates of common features as described above, the rotational component of each transform is adjusted as will now be described with reference to FIG. 6.

With the image links determined, a reference, or first image is placed into the 3D model. The default location for the first image is on the equator at the estimated focal length (the negative z direction), at the average latitude of all images (step 510). Each subsequent image in the series is then placed into the 3D model in turn as a test image for being located relative to the previously located, or base, image. The initial location of the test image plane is based on the initial estimation of the image's focal length and the rotation matrix that links it with a previous image (step 512). The 3D coordinates of the matching feature points in adjoining images are then compared, and the rotation matrix is adjusted to minimize the error between all pairs of 3D feature points for the adjoining image pair (step 514).

The error between a pair of feature points is the Euclidean distance between a point in 3D projected from one image to a 3D point in its adjoining image. This can be found by $$q \begin{pmatrix} x_r \\ y_r \\ z_r \end{pmatrix} = \begin{pmatrix} x_c \\ y_c \\ z_c \end{pmatrix} + s \begin{pmatrix} x_A \\ y_A \\ z_A \end{pmatrix} + t \begin{pmatrix} x_B \\ y_B \\ z_B \end{pmatrix} \quad (12)$$

$(x_r\, y_r\, z_r)^T$ is the normalized vector of the ray of the feature point in a test image (i.e. line from the origin to the feature point), and the three vectors on the right hand side are frame parameters of the base image. That is, $(x_c\, y_c\, z_c)^T$ is the three-dimensional center of the base image, $(x_A\, y_A\, z_A)^T$ is the x-axis of the base image, and $(x_B\, y_B\, y_B)^T$ is the y-axis of the base image. As can be seen, this is a system with three equations and three unknowns, and therefore a minimum error for each feature pair's corresponding coordinates can be found by solving this system.

Equation (12) represents the projection of a feature point from a first image onto its neighbouring adjoining image. $(x_r\, y_r\, z_r)^T$ is the normalized ray direction to a feature point on the first image. Multiplying this ray by a magnitude of q projects a point onto the adjoining image's image plane. Ideally, this point should be at the same coordinate of matching feature point on the adjoining image. However, when there is error, this will not be the case. (s,t) is the coordinate of the corresponding feature point in the image-space of the adjoining image. Therefore, starting at the center of the image $((x_c\, y_c\, z_c)^T$ in 3D), moving s units along the adjoining image plane's x-axis $((x_A\, y_A\, z_A)^T$ in 3D) and t units along the image plane's y-axis $((x_B\, y_B\, z_B)^T$ in 3D), takes one to the feature point on the adjoining image's plane from the adjoining image's point of view. Therefore, the error is the distance between the intersection point between ray of $(x_r\, y_r\, z_r)^T$ and the plane of the adjoining image, and the corresponding feature point of that ray on the plane of the adjoining image. The total error over all matching feature points between the two images is:

$$\sum_{\text{for all matching points}} \left\| q \begin{pmatrix} x_r \\ y_r \\ z_r \end{pmatrix} - \begin{pmatrix} x_c \\ y_c \\ z_c \end{pmatrix} - s \begin{pmatrix} x_A \\ y_A \\ z_A \end{pmatrix} - t \begin{pmatrix} x_B \\ y_B \\ z_B \end{pmatrix} \right\|^2 \quad (13)$$

Minimization comprises iteratively solving the refinement rotation matrix $\Delta R$. For each pair of matching feature points, $$\Delta R \cdot \begin{pmatrix} x_t \\ y_t \\ z_t \end{pmatrix} = \begin{pmatrix} x_s \\ y_s \\ z_s \end{pmatrix} \quad (14)$$

where:

$(x_t\, y_t\, z_t)^T$ is the normalized feature point ray vector of point P11 on image 1,;

$(x_s\, y_s\, z_s)^T$ is the normalized feature point ray vector of point P21 image 2; and P11 and P21 are a pair of matching points from the 2D matching point list.

For all feature points, there are over-constrained linear equations:

$$\Delta R \cdot \begin{pmatrix} x1_t \\ y1_t \\ z1_t \end{pmatrix} = \begin{pmatrix} x1_s \\ y1_s \\ z1_s \end{pmatrix} \quad (15)$$

$$\Delta R \cdot \begin{pmatrix} x2_t \\ y2_t \\ z2_t \end{pmatrix} = \begin{pmatrix} x2_s \\ y2_s \\ z2_s \end{pmatrix}$$

$$\vdots$$

$$\Delta R \cdot \begin{pmatrix} xn_t \\ yn_t \\ zn_t \end{pmatrix} = \begin{pmatrix} xn_s \\ yn_s \\ zn_s \end{pmatrix}$$

Solving the equations yields the refinement rotation matrix $\Delta R$. The frame parameters can be re-calculated as follows:

calculate the new 3D center point of each image plane (by rotating the old center point);

calculate the new focal length (the distance between origin and the image center);

calculate the new normal (the vector from the image center to the origin)

calculate the new four vertices; and calculate the new two axis vectors (x-axis and y-axis).

The error between all of the feature point rays after the correction is calculated according to equation (13), to see if the error actually converges. If not, the iterations are stopped. As long as there is convergence, the process is repeated up to 10 times.

Upon minimizing the error between the feature point rays, the focal lengths are adjusted using the adjusted rotation matrices and the corresponding transforms (step 516). In order to simplify the above process, an assumption is made that the center points of all of the images in the same row should be on the same latitude. Therefore, steps 512 to 516 are repeated (step 518), the second time with the reference frame put in a default value that is at the average latitude between of the images in the row from the previous estimation (step 520). Based on the adjusted rotation components and the transform, the focal lengths are re-estimated.

With the rotational components of each transform having been adjusted as described above, the rotational and focal length components of all of the transforms are concurrently adjusted. Preferably this global optimization is run where there is a long sequence of images spanning 360 degrees, or if there is more than 1 row and 1 column of images with an extent greater than 1. During global optimization, the sum of the error between all the feature point rays of the corresponding 3D feature point coordinates from all images is minimized concurrently. Global optimization significantly reduces error accumulated through a long sequence. This is particularly true in a 360 degree panorama case, in which the first and the last images may not match after the pair by pair error minimization.

Figure 7:
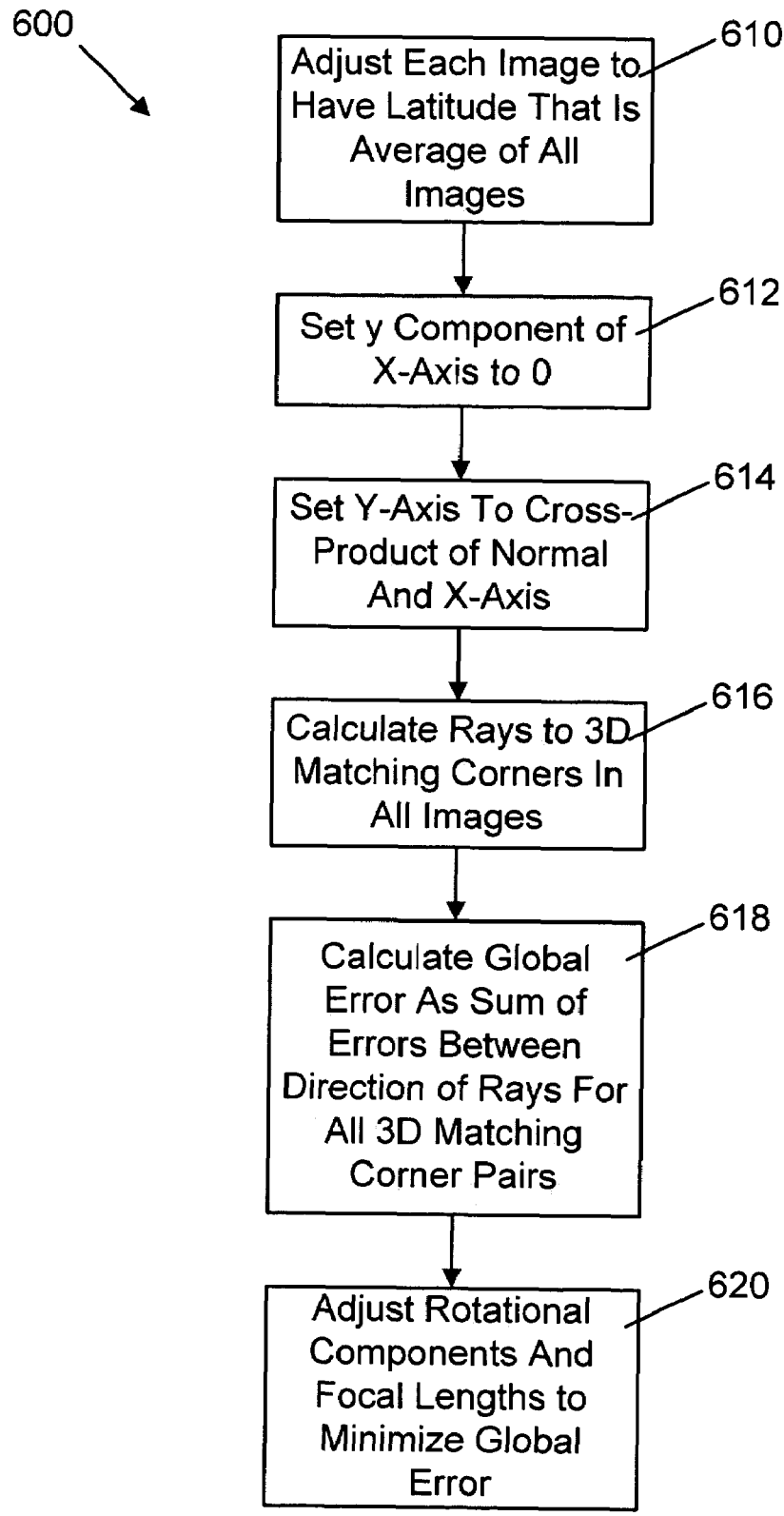
FIG. 7 is a flowchart showing the steps performed during adjustment of all rotational components and focal lengths concurrently to minimize the global error between the matching three-dimensional coordinates.

As shown in FIG. 7, an initial setup step is carried out before performing global optimization. After the pair by pair estimation step, the sequence very often produces a wave-like panorama, since the initially estimated focal length may be incorrect, and the pair by pair estimation only takes into account the current image with its neighboring images. Therefore, each of the images is adjusted to a latitude that is the average latitude of all the images (step 610). The image parameters are corrected such that the x-axis points horizontally (x-axis of the image has a zero y-component) (step 612)

and the y-axis points in the general upwards direction given by cross-product of the normal and the x-axis vectors (step 614).

The global error is minimized by correcting four parameters from each image, namely the focal length, and the rotation angles from each of the three dimensions. The feature point ray $p_j$ to each corresponding feature point is obtained (step 616), and the error is:

$$E(\{R_k, f_k\}, p_j) = \sum_{j,k} \|p_{jk} - p_j\|^2 \quad (16)$$

where $p_{jk}$ is the normalized ray vector of j-th feature point on the k-th image. This can be expressed as $$p_{jk} = \begin{pmatrix} \dfrac{fx_N + Ax_A + Bx_B}{l_{jk}} \\ \dfrac{fy_N + Ay_A + By_B}{l_{jk}} \\ \dfrac{fz_N + Az_A + Bz_B}{l_{jk}} \end{pmatrix} \quad (17)$$

where:

$$l_{jk} = \sqrt{(fx_N + Ax_A + Bx_B)^2 + (fy_N + Ay_A + By_B)^2 + (fz_N + Az_A + Bz_B)^2} \quad (18)$$

For the k-th image in 3D space, $(x_N, y_N, z_N)$ is the normal; $(x_A, y_A, z_A)$ is the x-axis, and $(x_B, y_B, z_B)^T$ is the y-axis.

The global optimization problem can then be expressed as minimizing the difference in feature point ray directions between all pairs (k,l) of overlapping images.

$$\mathrm{Min}[E\{R_k, f_k\}] = \mathrm{Min}\left[\sum_{j,k,l} \|p_{jk} - p_{jl}\|^2\right] \quad (19)$$

If the rotation matrix and focal length are iteratively updated with small changes, then the global error, can be approximated (step 618) by taking the first order derivatives:

$$E(\{R_k, f_k\}) \approx \sum_{j,k,l} \|H_{jk} y_k - H_{jl} y_l + e_j\|^2 \quad (20)$$

where:

$$e_j = p_{jk} - p_{jl} \quad (21)$$

$$y_k = [\,\delta\theta_x \;\; \delta\theta_y \;\; \delta\theta_z \;\; \delta f_k\,]^T \quad (22)$$

$$H_{jk} = \left[\dfrac{\delta p_{jk}}{\delta\theta_x} \;\; \dfrac{\delta p_{jk}}{\delta\theta_y} \;\; \dfrac{\delta p_{jk}}{\delta\theta_z} \;\; \dfrac{\delta p_{jk}}{\delta f_k}\right]^T \quad (23)$$

$$\Omega_k = [\,\theta_x \;\; \theta_y \;\; \theta_z\,]^T, \quad (24)$$

and the rotation matrix in Rodriguez's form $$X(\Omega) = \begin{bmatrix} 0 & -\theta_z & \theta_y \\ \theta_z & 0 & -\theta_x \\ -\theta_y & \theta_x & 0 \end{bmatrix} \quad (25)$$

$$\dfrac{\delta p_{jk}}{\delta\Omega_k} = \dfrac{\delta(I + X(\Omega))p_{jk}}{\delta\Omega_k} = \dfrac{\delta}{\delta\Omega_k}\begin{bmatrix} 1 & -\theta_z & \theta_y \\ \theta_z & 1 & -\theta_x \\ -\theta_y & \theta_x & 1 \end{bmatrix} p_{jk} = -X(p_{jk}) \quad (26)$$

and $$\dfrac{\delta p_{jk}}{\delta f_k}$$

can be computed by taking the partial derivative of $p_{jk}$ with respect to $f_k$ in the expression above.

As a result, the global optimization process becomes an over-determined system of equations, in the form:

$$[\,H_{jk} \;\; -H_{jl}\,]\begin{bmatrix} y_k \\ y_l \end{bmatrix} = -e_j \quad (27)$$

By including the image parameters from all the images, the rotational components and focal lengths are refined to minimize global error (step 620), using a least-squares (LSQR) algorithm.

Although a particular embodiment of camera position information estimation from a series of two-dimensional images that combine to form a panorama has been described, it will be appreciated that alternatives are available. For example, as described above, estimation of rotational components of the projective transform is on the basis of an initial estimate of focal length, which is determined to be the length of the respective image diagonal. However, one of ordinary skill in the art will understand that there are other approaches to estimating the rotational components. For instance, rotational components may be estimated by determining the degree span of the panorama, and equally spacing the sequenced images. Local and global adjustments may then be performed.

Furthermore, while particular numbers of iterations for various steps described above have been used, it will be understood that a greater or fewer number of iterations may be employed based on particular needs of an application embodying the invention. In the same manner, true error minimization as described need not strictly be obtained. Rather, a reduction in errors to the extent possible or necessary within constraints of the application embodying the invention is desirable.

While the use of matching corners has been found to be particularly suitable, it will be understood that different methods can be employed in order to determine common features in adjoining images other than by detection of matching corners with scores and relaxation as described above.

Although embodiments have been described, those of skill in the art will appreciate that variations and modifications may be made without departing from the spirit and scope of the invention defined by the appended claims.

What is claimed is:

1. A method of estimating camera position information from a series of source images that form a panorama, the method comprising:
    using a processor to carry out the steps of;
    estimating a transform between adjoining image pairs in said series based on common features within said adjoining image pairs;
    determining a rotational component for each transform and three-dimensional coordinates for said common features;
    adjusting each of the rotational components to reduce errors between corresponding ones of said coordinates in adjoining image pairs; and calculating focal lengths based on the adjusted rotational components;
wherein said determining is done on the basis of an initial focal length;
in the event that predetermined conditions are satisfied, concurrently refining the focal lengths and rotational components to globally reduce errors between corresponding ones of said coordinates in all image pairs;
prior to said refining, adjusting a position of each of said images to an average latitude of all images in said series;
setting the y-component of the x-axis of each image to zero; and
setting the y-axis of each image to the cross-product of said x-axis and the respective image normal.

2. The method of claim 1, wherein said determining is done on the basis that said source images are evenly spaced across said panorama.

3. The method of claim 1, wherein said common features are matching corners.

4. The method of claim 3, wherein said transform is a projective transform.

5. The method of claim 1, wherein said initial estimate of focal length for each image is a respective image diagonal length calculated according to:

$$\text{Diagonal\_Length} = \sqrt{(\text{IMAGE\_Width})^2 + (\text{IMAGE\_Height})^2}$$

6. The method of claim 1, wherein three-dimensional image parameters for use during said determining are calculated based on said initial estimate of focal length.

7. The method of claim 6, wherein said three-dimensional image parameters comprise image center point, image vertices, image normal, x-axis and y-axis parameters.

8. A method of estimating camera position information from a series of source images that form a panorama, the method comprising:
using a processor to carry out the steps of;
estimating a transform between adjoining image pairs in said series based on common features within said adjoining image pairs;
determining a rotational component for each transform and three-dimensional coordinates for said common features;
adjusting each of the rotational components to reduce errors between corresponding ones of said coordinates in adjoining image pairs; and
calculating focal lengths based on the adjusted rotational components;
wherein in the event that predetermined conditions are satisfied, concurrently refining the focal lengths and rotational components to globally reduce errors between corresponding ones of said coordinates in all image pairs;
prior to said refining, adjusting a position of each of said images to an average latitude of all images in said series;
setting the v-component of the x-axis of each image to zero; and
setting the v-axis of each image to the cross-product of said x-axis and the respective image normal;
wherein said determining is done on the basis of an initial focal length;
prior to said adjusting, placing a reference image onto an equator of a three-dimensional model, at a distance equal to a respective initial estimate of focal length from an origin of said model; and
sequentially placing adjoining images into said model based on respective initial estimates of focal length and rotational component and identifying rays from said origin to corresponding ones of said coordinates in adjoining images;
wherein said adjusting comprises minimizing error in direction between corresponding ones of said rays.

9. The method of claim 8, wherein said error in direction is the Euclidean distance between corresponding ones of said coordinates, according to:

$$q \begin{pmatrix} x_r \\ y_r \\ z_r \end{pmatrix} = \begin{pmatrix} x_c \\ y_c \\ z_c \end{pmatrix} + s \begin{pmatrix} x_A \\ y_A \\ z_A \end{pmatrix} + t \begin{pmatrix} x_B \\ y_B \\ z_B \end{pmatrix}$$

where $(X_r\ y_r\ Z_r)^T$ is the normalized vector of a ray to a coordinate in a first adjoining image in one of said pairs;
$(x_c\ y_c\ z_c)^T$ is the three-dimensional center of a second adjoining image in said one pair;
$(X_A\ Y_A\ Z_A)^T$ is the x-axis of said second adjoining image; and
(XB y z8 )T is the y-axis of said second adjoining image.

10. The method of claim 9, wherein center points of all images in a common row are assumed to have a common latitude.

11. The method of claim 10, wherein said placing and adjusting steps are performed iteratively a predetermined number of times.

12. The method of claim 1, wherein said predetermined conditions comprise at least one of:
said series of source images form a 360 degree panorama;
said series of source images form greater than one row with an extent greater than one; and
said series of source images form greater than one column with an extent greater than one.

13. The method of 1, wherein said refining comprises correcting focal lengths, and rotation angles for each of three-dimensions.

14. An apparatus for estimating three dimensional camera position information from a set of two dimensional images forming a panorama, the device comprising:
a transform estimator estimating a transform between adjoining image pairs in said series based on common features within said adjoining image pairs;
a rotational component determinor determining a rotational component for each transform and three-dimensional coordinates for said common features;
an adjustor adjusting each of the rotational components to reduce errors between corresponding ones of said coordinates in adjoining image pairs; and
a focal length calculator calculating focal lengths based on the adjusted rotational components
wherein said determining is done on the basis of an initial focal length;
in the event that predetermined conditions are satisfied, concurrently refining the focal lengths and rotational components to globally reduce errors between corresponding ones of said coordinates in all image pairs;
prior to said refining, adjusting a position of each of said images to an average latitude of all images in said series;
setting the y-component of the x-axis of each image to zero; and
setting the v-axis of each image to the cross-product of said x-axis and the respective image normal.

* * * * *

UNITED STATES PATENT AND TRADEMARK OFFICE
CERTIFICATE OF CORRECTION

PATENT NO. : 7,565,029 B2
APPLICATION NO. : 11/177811
DATED : July 21, 2009
INVENTOR(S) : Hui Zhou et al.

It is certified that error appears in the above-identified patent and that said Letters Patent is hereby corrected as shown below:

Column 14, Line 58, change ";" to --:--

Column 15, Line 37, change ";" to --:--

Column 15, Line 56, change "v-component" to --y component--

Column 15, Line 58, change "v-axis" to --y-axis--

Column 16, Line 16, change "$(X_r \ y_r \ Z_r)^T$" to --$(x_r \ y_r \ z_r)^T$--

Column 16, Line 20, change "$(X_A \ Y_A \ Z_A)^T$" to --$(x_A \ y_A \ z_A)^T$--

Column 16, Line 22, change "(XB y z8 )T" to --$(x_B \ y_B \ z_B)^T$--

Column 16, Line 63, change "v-axis" to --y-axis--

Signed and Sealed this

Twenty-ninth Day of June, 2010

David J. Kappos
*Director of the United States Patent and Trademark Office*